(12) United States Patent
Tarkoma

(10) Patent No.: US 8,966,377 B2
(45) Date of Patent: Feb. 24, 2015

(54) METHOD AND APPARATUS FOR A VIRTUAL DESKTOP

(75) Inventor: Sasu Tarkoma, Helsinki (FI)

(73) Assignee: Nokia Corporation, Espoo (FI)

( * ) Notice: Subject to any disclaimer, the term of this patent is extended or adjusted under 35 U.S.C. 154(b) by 281 days.

(21) Appl. No.: 12/860,561

(22) Filed: Aug. 20, 2010

(65) Prior Publication Data

US 2012/0047443 A1 Feb. 23, 2012

(51) Int. Cl.
*G06F 3/00* (2006.01)
*G06F 9/44* (2006.01)

(52) U.S. Cl.
CPC .................................. *G06F 9/4445* (2013.01)
USPC .................. 715/744; 717/172; 718/1; 709/23

(58) Field of Classification Search
CPC ... G06F 9/4445; G06F 3/067; H04L 67/2804; H04L 67/10
See application file for complete search history.

(56) References Cited

U.S. PATENT DOCUMENTS

| 2002/0070968 | A1 | 6/2002 | Austin et al. |
| 2003/0195950 | A1 | 10/2003 | Huang et al. |
| 2003/0225840 | A1 | 12/2003 | Glassco et al. |
| 2004/0012626 | A1 | 1/2004 | Brookins |
| 2004/0104931 | A1 | 6/2004 | Schmitt |
| 2005/0120349 | A1 | 6/2005 | Wright |
| 2005/0149922 | A1 * | 7/2005 | Vincent .......................... 717/172 |
| 2006/0089938 | A1 | 4/2006 | Leonard et al. |
| 2007/0192325 | A1 | 8/2007 | Morris |
| 2007/0198677 | A1 | 8/2007 | Ozhan et al. |
| 2008/0005278 | A1 | 1/2008 | Betz et al. |
| 2008/0034364 | A1 * | 2/2008 | Lam et al. ......................... 718/1 |
| 2009/0217177 | A1 | 8/2009 | DeGrazia |
| 2009/0313406 | A1 | 12/2009 | Suh et al. |
| 2010/0211663 | A1 * | 8/2010 | Barboy et al. ................. 709/223 |

FOREIGN PATENT DOCUMENTS

| CN | 101600010 A | 12/2009 |
| WO | WO 2008/132693 A2 | 11/2008 |

OTHER PUBLICATIONS

International Search Report for PCT Application No. PCT/FI2011/050480 dated Oct. 28, 2011, pp. 1-6.
Written Opinion for PCT Application No. PCT/FI2011/050480 dated Oct. 28, 2011, pp. 1-7.
MobiDesk: mobile virtual desktop computing, Baratto et al., MobiCom'04, Sep. 26-Oct. 1, 2004, Philadelphia, Pennslyvania, USA, pp. 1-15.
Pad: an alternative approach to the computer interface, Perlin et al., in Proceedings of the 20th Annual Conference on Computer Graphics and interactive Techniques, Anaheim, CA, Aug. 2-6, 1993, pp. 57-64.

* cited by examiner

*Primary Examiner* — Boris Pesin
*Assistant Examiner* — Ayesha Huertas Torres
(74) *Attorney, Agent, or Firm* — Ditthavong & Steiner, P.C.

(57) ABSTRACT

An approach is provided for managing desktop components. A device determines to facilitate access to at least one interface for subscribing to one or more inputs of one or more desktop components, advertising the availability of one or more subscriptions to one or more outputs of the one or more desktop components, publishing the one or more outputs of the one or more desktop components, or a combination thereof. The one or more desktop components generate the one or more outputs based, at least in part, on the one or more inputs.

19 Claims, 10 Drawing Sheets

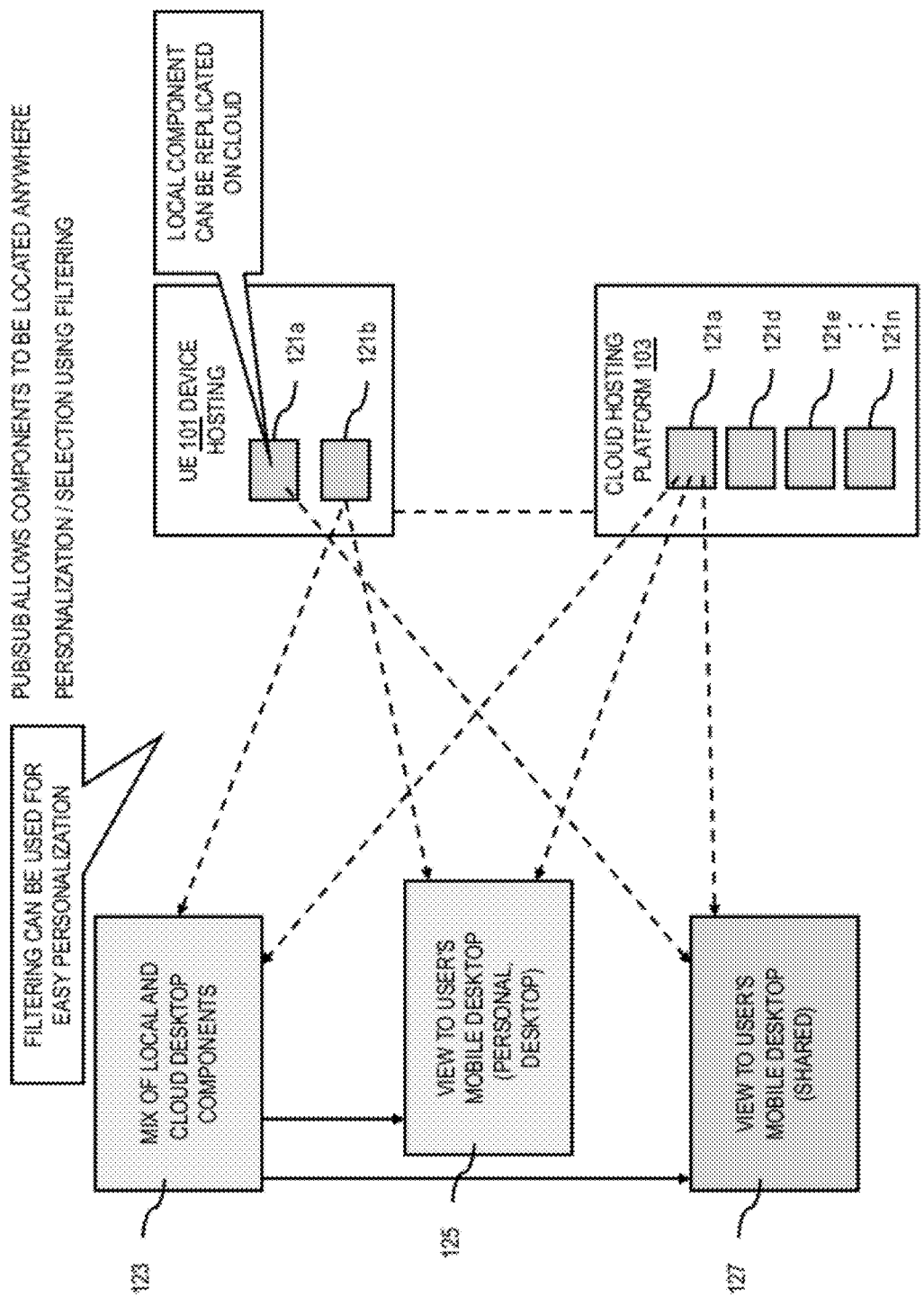

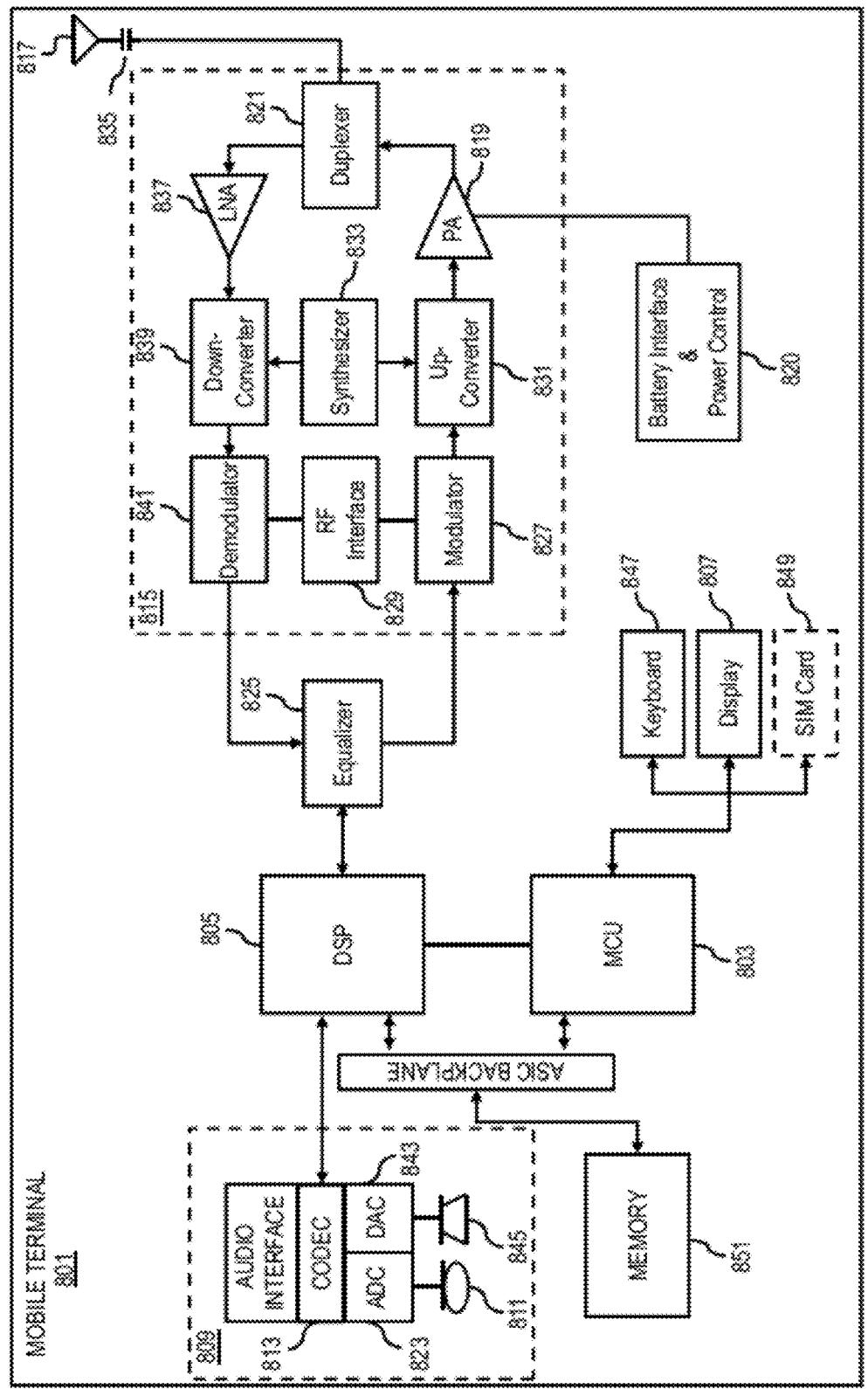

METHOD AND APPARATUS FOR A VIRTUAL DESKTOP

BACKGROUND

Service providers and device manufacturers (e.g., wireless, cellular, etc.) are continually challenged to deliver value and convenience to consumers by, for example, providing compelling network services. One area of interest has been the development of methods for integrating the services on, for instance, a common desktop (e.g., a desktop user interface on a user device). For example, service providers often enable or provide client applications (e.g., widgets) that can be organized on a desktop interface for access to the data, features, functions, etc. of one or more of the services. However, with the advent of a growing array of new services and devices, service providers and device manufacturers face significant challenges to enabling users to efficiently organize, associate, or otherwise manipulate these services via the desktop over one or more devices.

SOME EXAMPLE EMBODIMENTS

Therefore, there is a need for an approach for efficiently managing applications and related components on a virtual desktop that potentially spans multiple devices.

According to one embodiment, a method comprises determining to facilitate access to at least one interface for subscribing to one or more inputs of one or more desktop components, advertising the availability of one or more subscriptions to one or more outputs of the one or more desktop components, publishing the one or more outputs of the one or more desktop components, or a combination thereof. The one or more desktop components generate the one or more outputs based, at least in part, on the one or more inputs.

According to another embodiment, an apparatus comprises at least one processor, and at least one memory including computer program code, the at least one memory and the computer program code configured to, with the at least one processor, cause, at least in part, the apparatus to determine to facilitate access to at least one interface for subscribing to one or more inputs of one or more desktop components, advertising the availability of one or more subscriptions to one or more outputs of the one or more desktop components, publishing the one or more outputs of the one or more desktop components, or a combination thereof. The one or more desktop components generate the one or more outputs based, at least in part, on the one or more inputs.

According to another embodiment, a computer-readable storage medium carries one or more sequences of one or more instructions which, when executed by one or more processors, cause, at least in part, an apparatus to determine to facilitate access to at least one interface for subscribing to one or more inputs of one or more desktop components, advertising the availability of one or more subscriptions to one or more outputs of the one or more desktop components, publishing the one or more outputs of the one or more desktop components, or a combination thereof. The one or more desktop components generate the one or more outputs based, at least in part, on the one or more inputs.

According to another embodiment, an apparatus comprises means for determining to facilitate access to at least one interface for subscribing to one or more inputs of one or more desktop components, advertising the availability of one or more subscriptions to one or more outputs of the one or more desktop components, publishing the one or more outputs of the one or more desktop components, or a combination thereof. The one or more desktop components generate the one or more outputs based, at least in part, on the one or more inputs.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1B is a diagram of a system with user equipment and cloud integration capable of maintaining a virtual desktop, according to one embodiment;

FIG. 8 is a diagram of a mobile terminal (e.g., handset) that can be used to implement an embodiment of the invention.

DESCRIPTION OF SOME EMBODIMENTS

Examples of a method, apparatus, and computer program for maintaining a virtual desktop are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
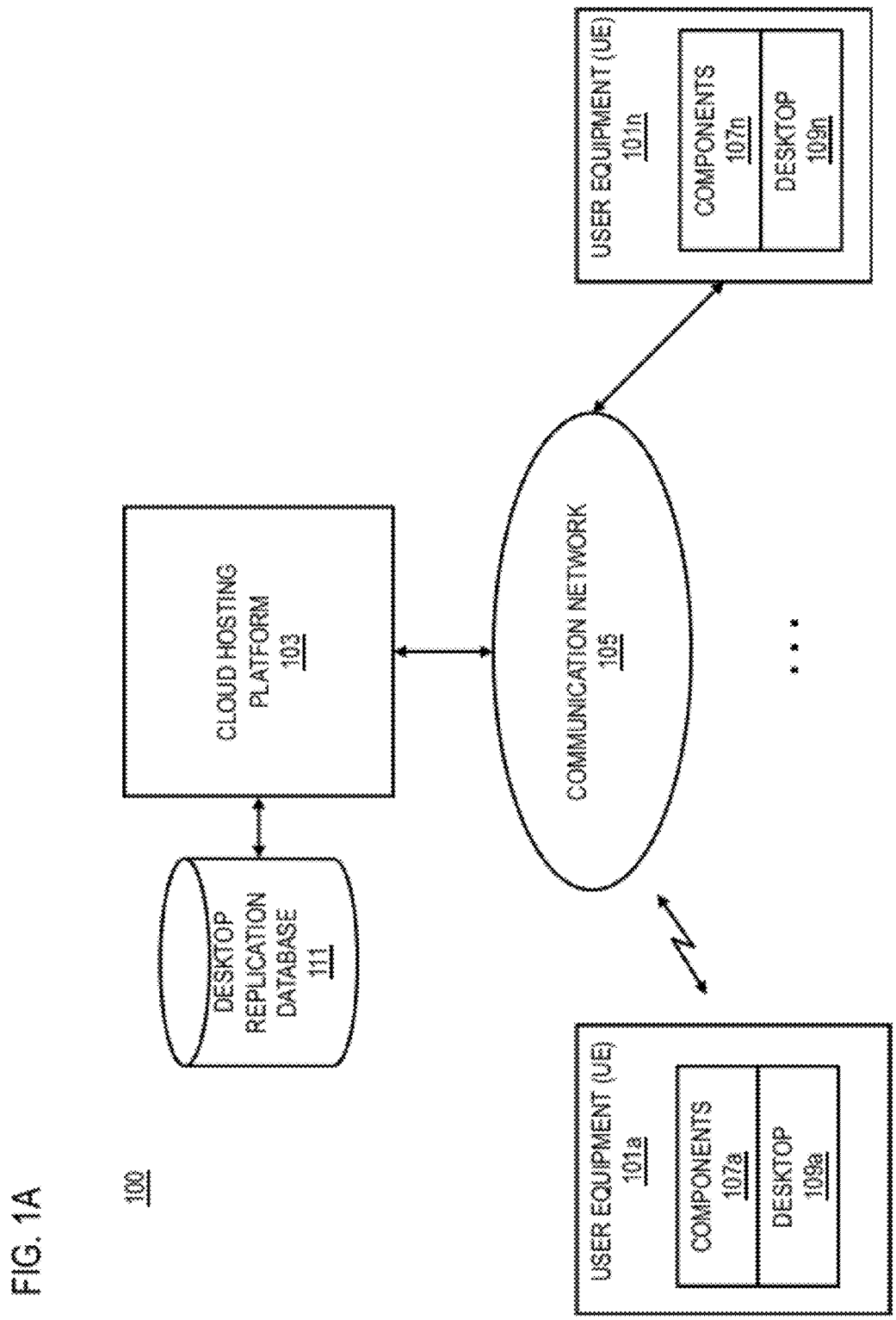
FIG. 1A is a diagram of a system capable of maintaining a virtual desktop, according to one embodiment.

FIG. 1A is a diagram of a system capable of maintaining a virtual desktop, according to one embodiment. As noted above, a desktop user interface (e.g., a mobile desktop) can include different components such as applications and widgets. In certain scenarios, a widget is a portable chunk of code that can be installed and executed within a separate web based (e.g., HyperText Markup Language (HTML) based) page without compilation. Some components can include corresponding and/or additional user interfaces and can access a variety of resources such as local (e.g., on device) resources (e.g., a calendar, contact information, etc.), remote (e.g., network) resources (e.g., instant messaging, electronic mail, social networking updates, etc.), etc. By way of example, some desktop components can be implemented via Hypertext Transfer Protocol (HTTP), Javascript, or other programming languages. Further, application programming interfaces (API) such as Javascript APIs or universal resource identifiers (URIs) can be utilized to access system-level resources.

Technical challenges can arise, for instance, when enabling interoperability of one or more desktop component, and when sharing one or more desktop components over multiple devices. For example, challenges are present in implementing and maintaining a virtual desktop that can be extended in multiple dimensions (e.g., multiple semantic dimensions such as when grouping components by semantically derived topics and/or categories) and can be shared across heterogeneous devices (e.g., mobile devices, personal computers, tablet computers, etc.). In certain embodiments, semantic dimensions can be implemented using methods and technologies that allow devices to understand the meaning or "semantics" of information associated with the respective desktop components.

To address this problem, a system 100 of FIG. 1A introduces the capability to manage desktop components (e.g., applications, services, etc.) in a virtual desktop through a publication/subscription framework. More specifically, the system 100 enables one or more desktop components to obtain subscriptions to one or more data sources (e.g., user input, output from other desktop components, databases, etc.) as their inputs (e.g., data on which the components operate or function), advertise the availability of their outputs (e.g., to inform other components the outputs are available for subscription), and then to publish the output for other components that have subscriptions to retrieve. In this way, the system 100 links the components in a desktop in a data or content-centric manner based on relationships established between the input of one desktop component and the output of another desktop component. These relationships may be extended to any number of desktop components (e.g., widgets, applications, etc.) to create an "endless" desktop of any collection components. For example, a calendar desktop component can subscribe to the output of a social networking component so that social networking updates can be reflected in a user's calendar. The calendar output can, in turn, be provided by subscription to yet another component (e.g., a mapping component) that can provide maps, directions, navigation, etc. to appointments in the calendar.

In one embodiment, the virtual desktop can be maintained by defining the desktop in a multi-semantic space. By way of example, a multi-dimensional semantic space can be implemented by subscribing component interfaces to content available from one or more desktop components. These desktop components can be located at different physical locations (e.g., different devices), as well as different semantic or logical locations (e.g., different categories, relationships, etc.). Moreover, the component subscriptions can be recursive and/or include information subscribed to by other components that can process the data and published them to other subscriptions. As such, the recursive combination of components can be utilized to combine or process information in unique modular combinations to form more robust component interfaces.

As shown in FIG. 1A, user equipment (UEs) 101a-101n can be utilized to communicate with a cloud hosting platform 103 via a communication network 105. The cloud hosting platform 103 can be utilized to implement the system 100 to allow access to one or more components 107a-107n of a respective desktop 109a-109n of a UE 101 to one or more other UEs 101a-101n. The system 100 can additionally be implemented via a publication/subscription (pub/sub) interface. In certain embodiments, the pub/sub is a messaging paradigm where publishers (senders) of messages send their messages based on one or more criteria. Published messages can be characterized into classes. These classes can be categorized without any knowledge of who the subscribers, if any, are. Subscribers express interest in one or more classes (e.g., by subscribing to the classes). As such, subscribers may only receive messages that are pertinent. Further, the subscribers may also have no knowledge of who the publishers are. As such, publishers and subscribers can be decoupled. A pub/sub interface can be implemented via, e.g., an HTTP or Representational State Transfer (REST) protocol for pub/sub interfaces. Further, a customized protocol for pub/sub can be developed (e.g., to includes various criteria). Customized protocols can include one or more distributed system buses or messaging busses.

The cloud hosting platform 103 can be utilized to facilitate access to an interface for subscribing to one or more inputs for a component 107. Thus, an API can be provided to one or more UEs 101 to access components 107 associated with other UEs 101. By way of example, a component 107n of UE 101n can subscribe to a component 107a of UE 101a. When the desktop component 107a is updated, the desktop component 107a can publish its information via a channel that is associated with the subscription. As such, the API can publish one or more outputs of desktop component 107a to the subscribing desktop component 107n. As further detailed in FIG. 1B, UE 101a can publish the update directly to the channel or can update a replicated desktop component 107 stored in a desktop replication database 111 associated with the cloud hosting platform 103.

Further, the cloud hosting platform 103 can facilitate access to the availability of one or more subscriptions to outputs of one or more desktop components 107. For example, and as further detailed in FIG. 3, the availability of one or more subscriptions obtained by the cloud hosting platform 103, maintained, and provided to UEs 101. The subscriptions can be advertised via a semantic space. By way of example, the semantic space can be associated with metadata describing the desktop components 107, availability of the desktop components (e.g., security and/or limitations associated with the subscription), or the like. Metadata can be data about data. For example, metadata can be data (e.g., a version number, one or more associations such as authorship or ownership, type of component such as a, calendar, clock, social networking information, or the like, date of creation, etc.) about a desktop component 107. As such, metadata can be utilized to organize and search for available subscriptions.

Thus, a first desktop component 107a of a first UE 101a can provide information associated with an output of the first desktop component 107a to the cloud hosting platform 103. The cloud hosting platform 103 can store this information and advertise the availability of first the desktop component 107a. A second component 107n of a second UE 101n can then search for and find the first component 107a. Then, the second UE 101n can subscribe to the output of the first component 107a. Once subscribed, when the first component 107a updates the first component 107a, the second component 107n can receive the update (e.g., via a channel associated with the subscription). In one scenario, this update can happen automatically (e.g., when the update is published to a channel, the update can be pushed to the second component). In another scenario, the update can send a notification of the update along with a location to allow the second component 107n to download the update. With this approach, the first desktop component 107a can update its output to multiple other desktop components (e.g., component 107*n*) subscribing to the output of the first desktop component.

Further, information associated with desktop components 107 can be chained. That is, the first network component 107*a* can be subscribed to by the second network component 107*n*, the second network component 107*n* may transform the input from the first network component 107*a* and output information to a third network component (not shown). Multiple such chains can be formed. Further, chains can include various different components 107 from the same UE 101. Additionally, the components 107 can recursively subscribe to themselves or to other components 107 that subscribe to them.

Moreover, in certain embodiments, the pub/sub components can be utilized to create a desktop or other information conveying format on a web page. The web page can be hosted via the cloud hosting platform 103, a UE 101, or other device (e.g., a server).

Additionally, the pub/sub operations may be supported by one or more software or hardware layers on a protocol stack. For example, in certain scenarios, the pub/sub operations can be managed to feed information to one or more graphics processors associated with a UE 101. As such, content can be directly published from a memory of the UE 101 or a network component (e.g., the cloud hosting platform 103) directly to a frame buffer and/or video memory.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101 and the cloud hosting platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

FIG. 1B is a diagram of a system with user equipment and cloud integration capable of maintaining a virtual desktop, according to one embodiment. According to this embodiment, the cloud hosting platform 103 or the UE 101 can host and/or maintain virtual desktop component subscriptions. As such, the cloud hosting platform 103 and/or the UE 101 can maintain subscriptions to components 121*a*-121*n*. Also, as shown, one or more components 121 of the UE 101 can be replicated on the cloud hosting platform 103. Further, in certain scenarios, the cloud hosting platform 103 can maintain subscriptions to components and another service can replicate local components to provide via the subscriptions. One or more interfaces 123, 125, 127 can be utilized to view components 121 via one or more hosting platform. The interfaces 123, 125, 127 can be implemented via, e.g., one or more UEs 101.

The first interface 123 can subscribe to a mix of local and cloud desktop components 121. As such, some of the subscriptions may be maintained by the cloud hosting platform 103 and other subscriptions may be maintained by the hosting UE 101. Further, as noted previously, the subscription can be managed by the cloud hosting platform 103, while the component 121 is hosted by the UE 101. In this example, the first interface 123 can have a desktop component that subscribes to component 121*a* from the cloud hosting platform 103 and another component 121*b* hosted on the hosting UE 101.

The user of the first interface 123 can additionally configure the user's subscriptions to filter one or more updates. For example, the first interface 123 subscribes to component 121*a* that subscribes to multiple desktop components for information. The user can set filters so that the user only receives updates for one or more types of information and/or from one or more associated users. This information can be stored as metadata in associated publications as well as for implementation of subscriptions. Further, filtering can allow for utilization of specific component interfaces as well as selection of only a subset of content emitted by a component (e.g., by filtering out a portion of the information associated with the component).

The second interface 125, in this example, can subscribe to the same components 121*a*, 121*b*, as the first interface 123 as well as to a component associated with the first interface 123. In certain scenarios, second interface 125 can subscribe to the same components 121*a*, 121*b* indirectly by subscribing to components associated with the first interface 123. Additionally, the components associated with the first interface 123 may transform or manipulate one or more of the components. Further, a mix of components from the first interface 123, other hosting UEs 101, and the cloud hosting platform 103 can be presented.

In one example, the first interface 123 can be hosted on a personal computer of a user. The second interface 125 can then be another UE 101 of the user that subscribes to components of the personal computer. The third interface 127 can additionally be implemented to share the user's desktop with other users. With these implementations, different security parameters can be utilized to prevent unwanted or unauthorized use of desktop components. For example, the users of the third interface 127 may have only read only access.

Figure 2A:
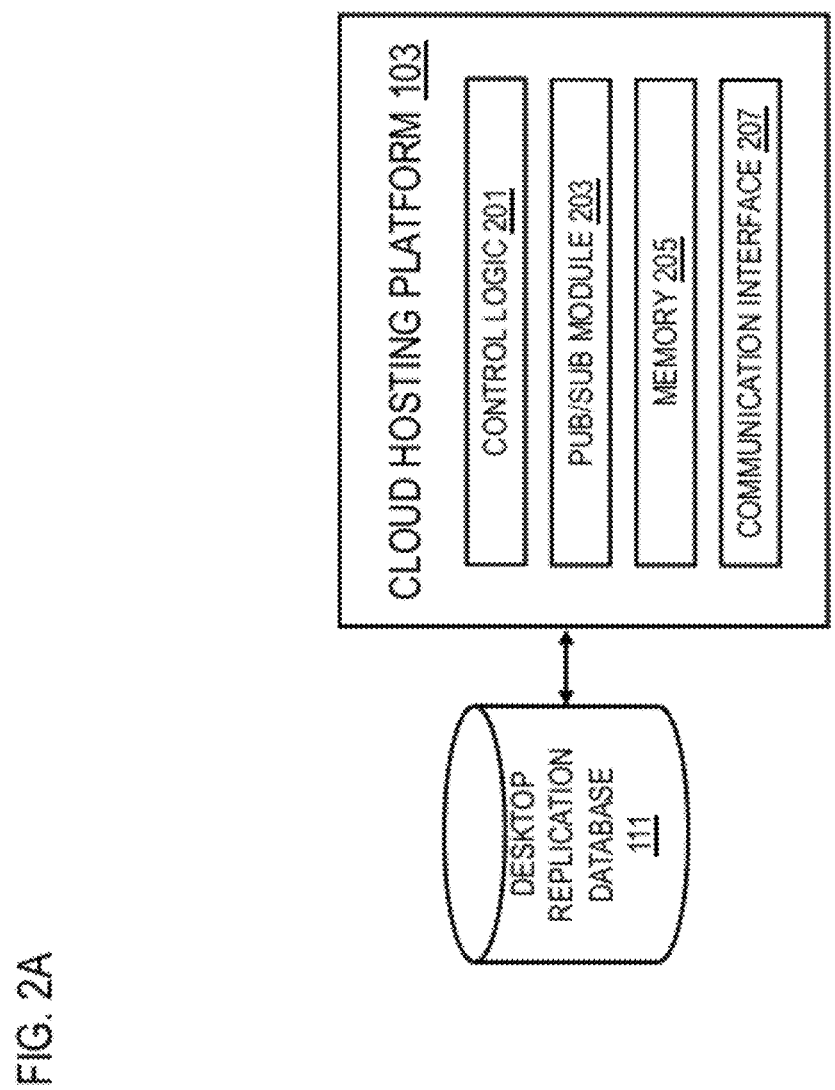
FIG. 2A is a diagram of the components of a cloud hosting platform, according to one embodiment.

FIG. 2A is a diagram of the components of a cloud hosting platform, according to one embodiment. By way of example, the cloud hosting platform 103 includes one or more components for implementing a pub/sub interface. It is contemplated that the functions of these components may be combined in one or more components or performed by other components of equivalent functionality. In this embodiment, the cloud hosting platform 103 includes control logic 201 to control processing, a pub/sub module 203 to control publication and subscription processes, a memory 205, and a communication interface 207 to communicate with other devices.

Control logic 201 can be utilized to control one or more processes of the cloud hosting platform 103. The control logic 201 can further be utilized to maintain a pub/sub interface as well as maintain one or more components.

In one embodiment, the communication interface 207 can be used to communicate with one or more UEs 101 or other devices. Certain communications can be via methods such as an internet protocol, messaging (e.g., Short Message Service (SMS), Multimedia Messaging Service (MMS), etc.), or any other communication method (e.g., via the communication networks 105).

As noted above, the pub/sub module 203 can be utilized to send and receive messages via publications and subscriptions. The control logic 201 can control subscriptions to one or more components. Additionally, the control logic 201 can maintain replicated components in a desktop replication database 111. The components in the desktop replication database 111 can subscribe to one or more other components. As such, the control logic 201 can control subscription of the components to one or more channels via the pub/sub module 203 to listen for relevant messages (e.g., messages associated with updates to the respective components). Further, the control logic 201 can be used by replicated components to publish information it wishes to communicate via the pub/sub module 203. Additionally, the control logic 201 can provide a subscription interface and store subscription information in a memory 205 as further detailed in FIG. 4.

Figure 2B:
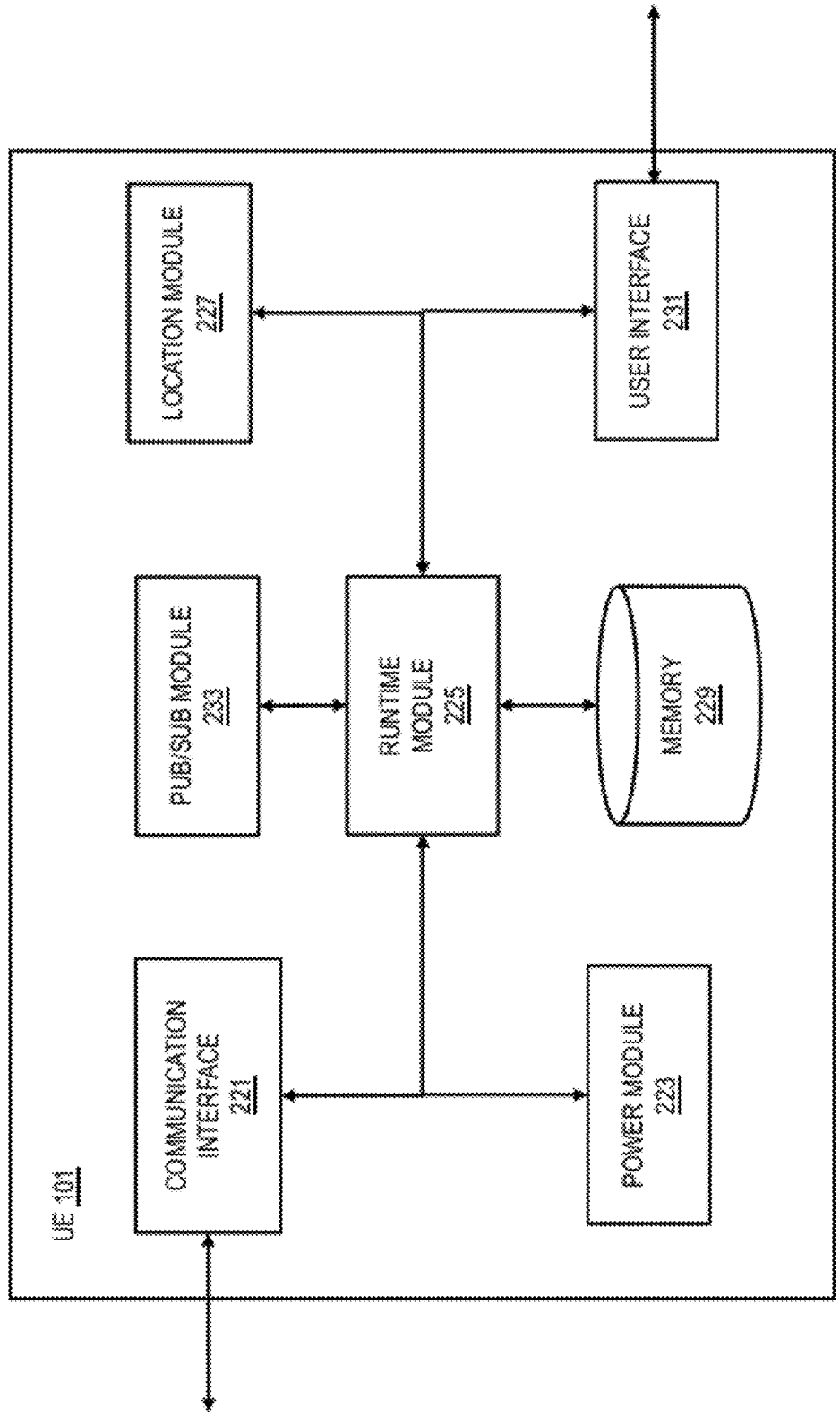
FIG. 2B is a diagram of the components of user equipment, according to one embodiment.

FIG. 2B is a diagram of the components of a user equipment, according to one embodiment. By way of example, the UE 101 includes one or more components for presenting desktop components and/or hosting desktop components. It is contemplated that the functions of these components may be combined in one or more components or performed by other components of equivalent functionality. In this embodiment, the UE 101 includes a communication interface 221, a power module 223, a runtime module 225, a location module 227, a memory 229, a user interface 231, and a pub/sub module 233.

In one embodiment, the communication interface 221 can be used to communicate with the cloud hosting platform 103 and/or other UEs 101. Certain communications can be via methods such as an internet protocol, messaging, or any other communication method (e.g., via the communication network 105). In some examples, the UE 101 can send and receive subscription requests via the communication interface 221 by utilizing the runtime module 225 and/or pub/sub module 233. The pub/sub module 233 can be utilized to control subscriptions and/or publications associated with one or more desktop components of the UE 101. Moreover, the subscriptions can be tied to particular desktop components and/or a combination of desktop components.

The power module 223 provides power to the UE 101. The power module 223 can include any type of power source (e.g., battery, plug-in, etc.). Additionally, the power module 223 can provide power to the components of the UE 101 including processors, memory, and transmitters. Additionally, power information associated with the power module 223 can be collected and store in memory 229. This information may be utilized for use in a desktop component and/or for publication of updates.

Further, the location module 227 can determine a user's location (e.g., if the UE 101 is mobile). The user's location can be determined by a triangulation system such as global positioning system (GPS), Assisted-GPS (A-GPS), Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 227 may also utilize multiple technologies to detect the location of the UE 101. Location coordinates can be determined using the location module 227. These location coordinates can be used by the runtime module 225 to display a user location on a map on a user interface 231 of the UE 101. Further, the current location of the UE 101 can be utilized in other navigational calculations (e.g., movement, readjusting search locations based on the location of the UE 101, etc.). This location information can be utilized in one or more desktop components as well as published as updates for desktop components subscribing to the one or more desktop components.

The user interface 231 can include various methods of communication. For example, the user interface 231 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 231 may be used to display one or more desktop components.

In one scenario, the desktop components can be presented on the user interface 231. As previously indicated, the desktop components can be updated via a pub/sub interface (e.g., using the pub/sub module 233 as well as the communication interface 221). Further, the desktop components may be updated via the user interface 231 (e.g., via an input). As such, when the desktop components are updated, an update for the desktop components can be published. As previously noted the UE 101 can publish the update directly or send a message to the cloud hosting platform 103 hosting a replicated desktop component to publish.

Figure 3:
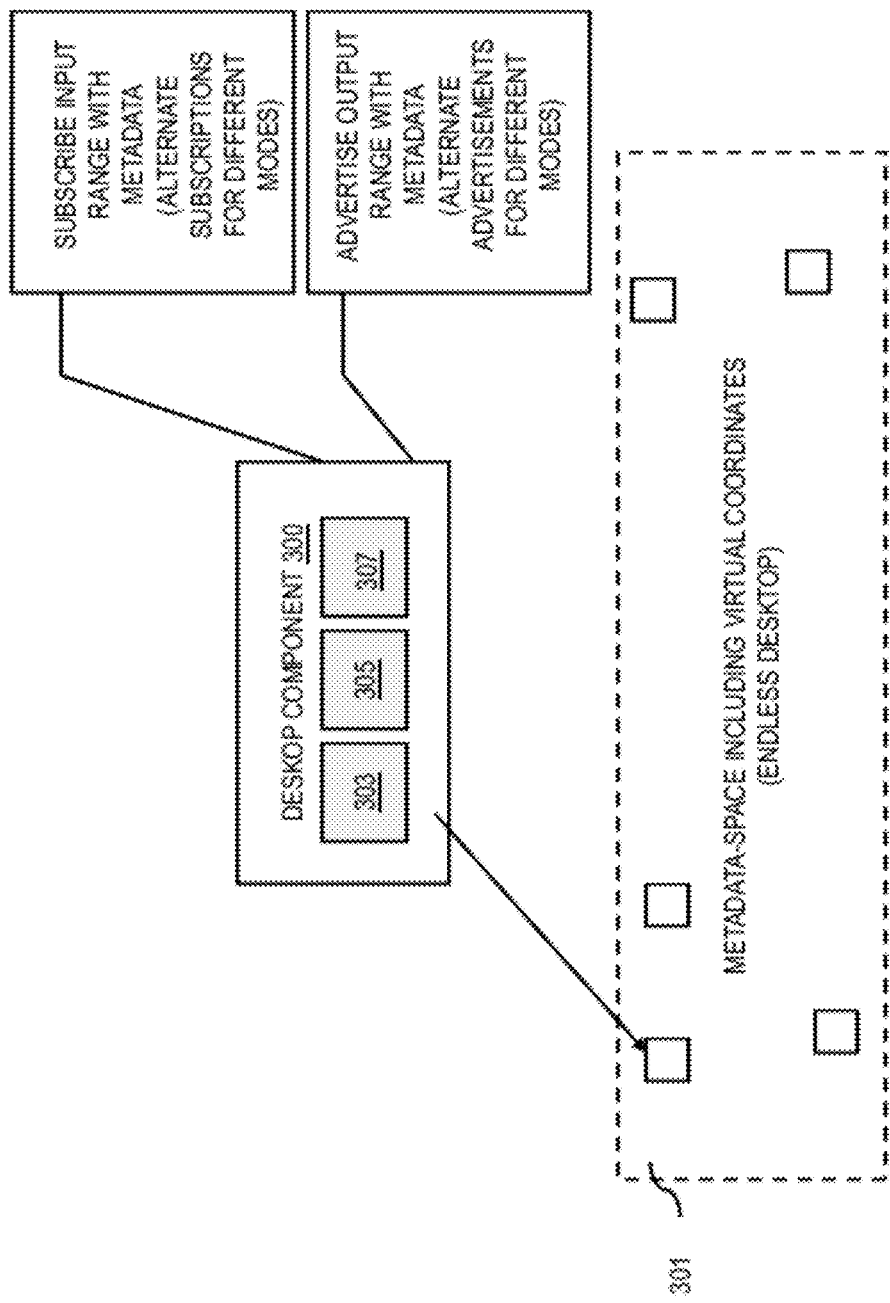
FIG. 3 is an overview of a desktop component, according to one embodiment.

FIG. 3 is an overview of a desktop component, according to one embodiment. As noted above, the user interface 231 of a UE 101 can include a desktop comprising one or more desktop components. Some desktop components can be local to the UE 101 and other desktop components can updated via a pub/sub interface from another location (e.g., a cloud hosting platform 103 or another UE 101). Further, one or more desktop components can provide output to allow other devices to receive updates.

The desktop component 300 can thus subscribe to input. As shown, the subscription can be based on an input range associated with metadata. This input range can be managed by the cloud hosting platform 103. For example, the desktop component 300 can subscribe to information associated with other desktop components with associated metadata including "celebrity_name" and "status." In certain scenarios, one or more different of the desktop can be utilized that can subscribe to different information and/or different filters to information. For example, the desktop component 300 may include one or more size parameters. As such, a basic user interface element of the desktop component 300 can be presented via a user interface 231 of a UE 101. This user interface element, when selected, can subscribe to different desktop components and/or different information. For example, filters may be utilized to limit (e.g., due to size constraints) information presented during normal display. However, when selected, the desktop component 300 can be resized to allow for greater information to be displayed. As such, the desktop component 300 can present information associated with additional and/or alternative subscriptions.

Moreover, in certain scenarios, the desktop component 300 can provide output that other desktop components can subscribe to. As such, the desktop component 300 can advertise an output range (e.g., associated metadata) via the cloud hosting platform 103. The cloud hosting platform 103 can address such information using a metadata-space 301 using virtual coordinates. As such, the desktop component 300 can be one of a vast amount of desktop components available via the cloud hosting platform 103. The UE 101 associated with the desktop component 300 and/or other components of UEs 101 can thus subscribe to the output of the desktop component 300. As noted earlier, these subscriptions can be chained and/or recursive.

In certain scenarios, a desktop on a user interface 231 of a UE 101 includes desktop components 300. The input subscriptions of the desktop components 300 and the output advertisements of the desktop components 300 can define the boundaries of the desktop. This desktop space can be partitioned and/or replicated over one or more UEs 101 and cloud components (e.g., servers).

Moreover, desktop component 300 can include subscriptions to other desktop components 303, 305, 307 and/or information from the other desktop components 303, 305, 307. For example, if desktop component 300 was a calendar component, the calendar component can include entries from the user's personal calendar as part of component 303, entries from other people's calendars as part of component 305, and/or other material (e.g., a web page) from component 307. Further, the desktop component 300 can support multiple views at multiple resolutions and/or provide simple structured data in a format (e.g., Extensible Markup Language (XML), Scalable Vector Graphics (SVG), HTML, or other suitable format). Moreover, as part of the metadata-space 301, other components that have access to the desktop component 300 (e.g., due to security parameters) can subscribe to the content of the whole of the desktop component 300. Also, this information can be filtered as detailed in FIG. 1B. For example, a corporate web page subscribing to the information may choose to reformat desktop component 300 to show components 303 and 305 as part of a corporate calendar including the user and another employee. Additionally or alternatively, such information can be published via a social networking site. In certain embodiments, the desktop component 300 can subscribe to itself and allow other users to publish to it. As such, other users may be able to interact with information associated with the desktop component 300.

Figure 4:
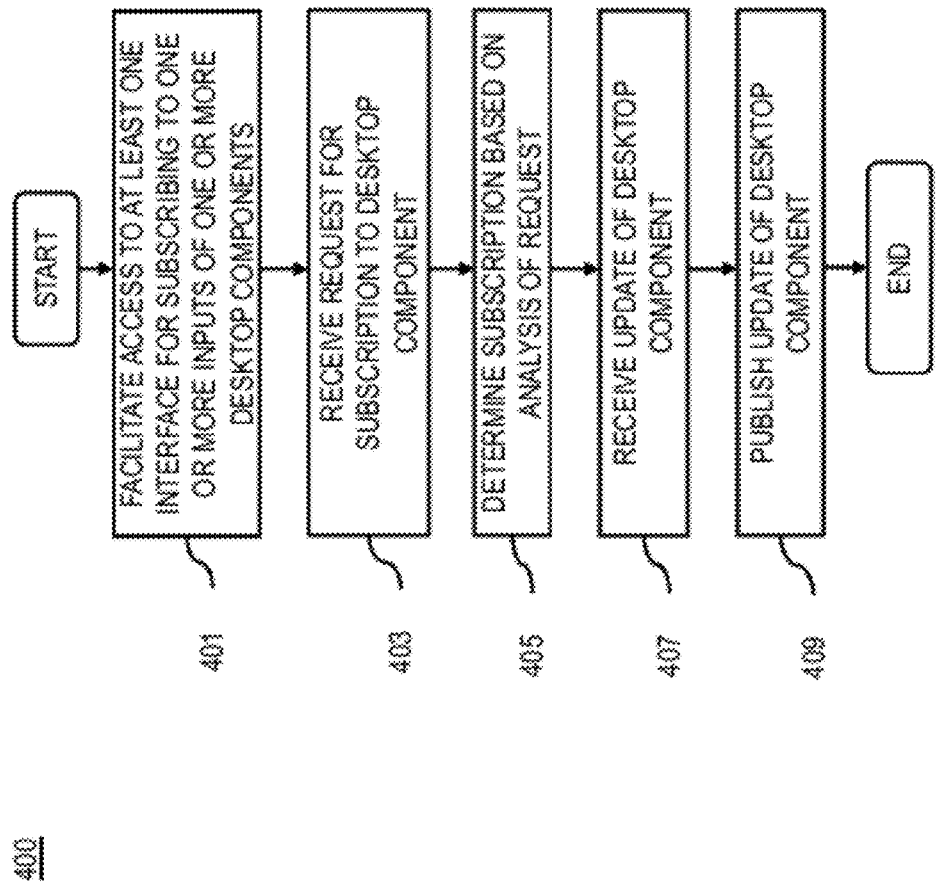
FIG. 4 is a flowchart of a process for maintaining a virtual desktop, according to one embodiment.
Figure 7:
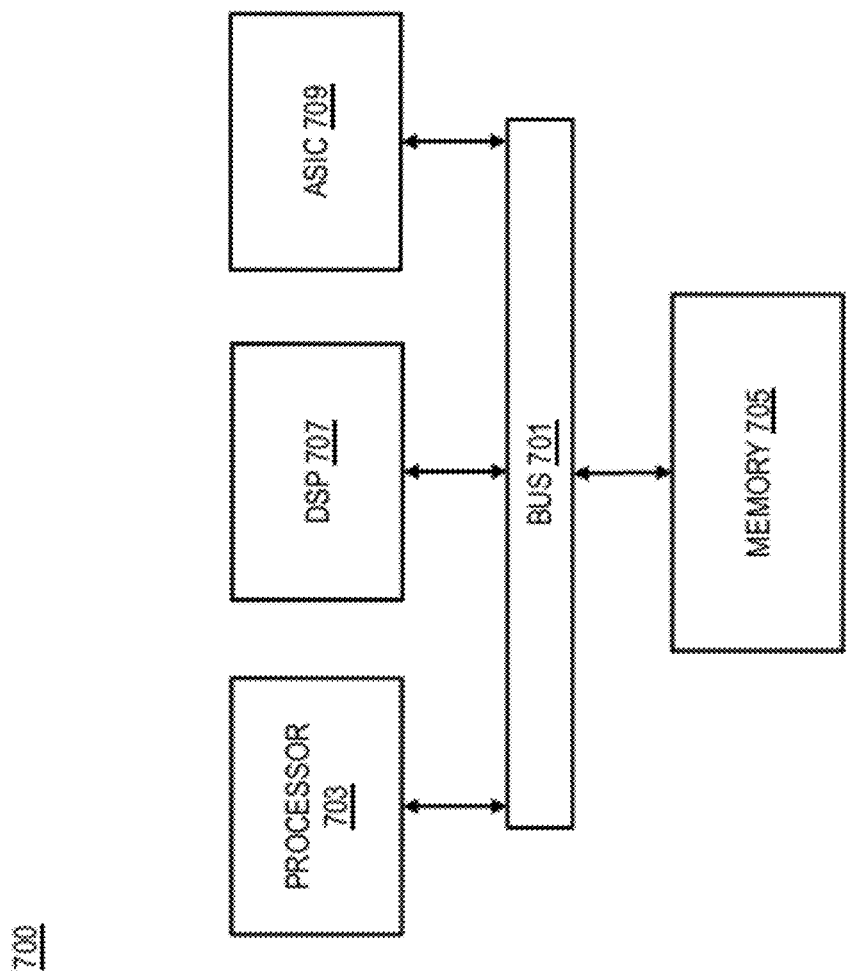
FIG. 7 is a diagram of a chip set that can be used to implement an embodiment of the invention.

FIG. 4 is a flowchart of a process for maintaining a virtual desktop, according to one embodiment. In one embodiment, the control logic 201 of the cloud hosting platform 103 performs the process 400 and is implemented in, for instance, a chip set including a processor and a memory as shown in FIG. 7. As such, the control logic 201 can provide means for accomplishing various parts of the process 400 as well as means for accomplishing other processes in conjunction with other components of the cloud hosting platform 103 and/or other devices (e.g., UEs 101).

The control logic 201 can determine to facilitate access to at least one interface (e.g., an API) for subscribing to one or more inputs of one or more desktop components 107 (step 401). A part of such an interface can include advertising the availability of one or more subscriptions to one or more outputs of the one or more desktop components 107. In certain embodiments, advertising the availabilities of one or more subscriptions can include the capability of the interface to accept one or more subscriptions and/or the capability of the desktop components to accept the one or more subscriptions. Additionally, the interface can include publishing of the one or more outputs of the one or more desktop components 107. By providing the interface, the cloud hosting platform 103 can assist in the management of providing desktop component information to other desktop components 107.

Through the interface, the control logic 201 can receive an advertisement from a desktop component 107 (e.g., via an application, operating system, etc. of an associated UE 101) of output associated with the desktop component 107. The desktop component 107 can be associated with metadata that can be utilized as an address in a metadata-space. The metadata can be utilized as criteria that can be used to select desktop components 107 to subscribe to. These desktop components 107 can be utilized to generate one or more desktops at UEs 101 by subscribing desktop components 107. As noted in FIG. 1B, these desktops can be part of a personalized desktop, a shared desktop, etc. The control logic 201 can then store the metadata information in memory (e.g., in a data structure defining the metadata-space). Further, the advertisement can be made available (e.g., as a publication on a channel that one or more UEs 101 subscribe, a web page, another interface, etc.) to UEs 101 and components 107. A desktop component 107 of a UE 101 can receive the advertisement and respond with a request for subscription.

At step 403, the control logic 201 receives a request, over the interface, from one or more desktop components 107 for a subscription to at least one of the one or more outputs of the desktop component 107. As noted above, the subscription request can occur in response to the advertisement. Further, as the subscription can be associated with a desktop component 107, the subscription can provide at least one input to the desktop component 107.

These inputs to the desktop components 107 of a particular user interface can define respective boundaries of the desktop space. For example, the desktop interface 123 from FIG. 1B can be defined using locally hosted desktop components, desktop components hosted at other UEs 101, cloud hosted desktop components, other devices (e.g., network servers, etc.), or a combination thereof. Moreover, because the desktop space can include inputs from various locations, the desktop space can comprise desktop components 107 or information associated from desktop components 107 of one or more devices (e.g., UEs 101), servers, network components, a combination thereof, etc. When a runtime module 205 of a UE 101 selects desktop components 107 to make up the desktop of the UE 101, the desktop can be generated based on the desktop components, which can be selected based on one or more criteria (e.g., metadata used to subscribe to desktop component inputs).

Once the subscription request is received, at step 405, the control logic 201 can determine a subscription based, at least in part, on a semantic analysis of the request. The semantic analysis can parse out any metadata associated with the request (e.g., flat labels, key words, one or more identifiers (e.g., identifying an author, identifying a subject such as a celebrity, identifying subject matter such as cars, homes, people, locations, etc.), one or more types of desktop components (e.g., based on size, based on functionality such as calendar function, social networking function, or the like, based on accessibility, or the like), etc.). Once parsed, the request can be mapped to one or more subscriptions meeting the criteria. Further, Boolean operations can be utilized on the parsed information to sort and/or otherwise determine subscriptions. In certain embodiments, the matching or partially matching subscriptions can be ranked based on a relevancy and one or more of the subscriptions can be selected. As earlier discussed, the subscriptions can be recursive and/or chained to allow for additional customization of desktop components 107.

Then, at step 407, the control logic 201 can receive an update of a desktop component 107 that is subscribed to. One or more parameters (e.g., security parameters such as username and password, device identifiers, location identifiers of an updating UE 101, permission or security certificates, etc.) can be utilized to ensure that only UEs 101 with permission to update (e.g., publish to) the subscription are allowed to post updates. The cloud hosting platform 103 can update a replicated version of the desktop component 107 stored in an associated memory. Further, the control logic 201 can update a data structure (e.g., a table) mapping updates and available updates to subscription channels.

At step 409, the control logic 201 can cause publication of the update on a channel associated with subscriptions to the desktop component 107 or information associated with the desktop component 107. The publication can occur by notifying a subscribed UE 101 or subscribed desktop component to the update or by publishing the actual content on the channel.

Figure 5:
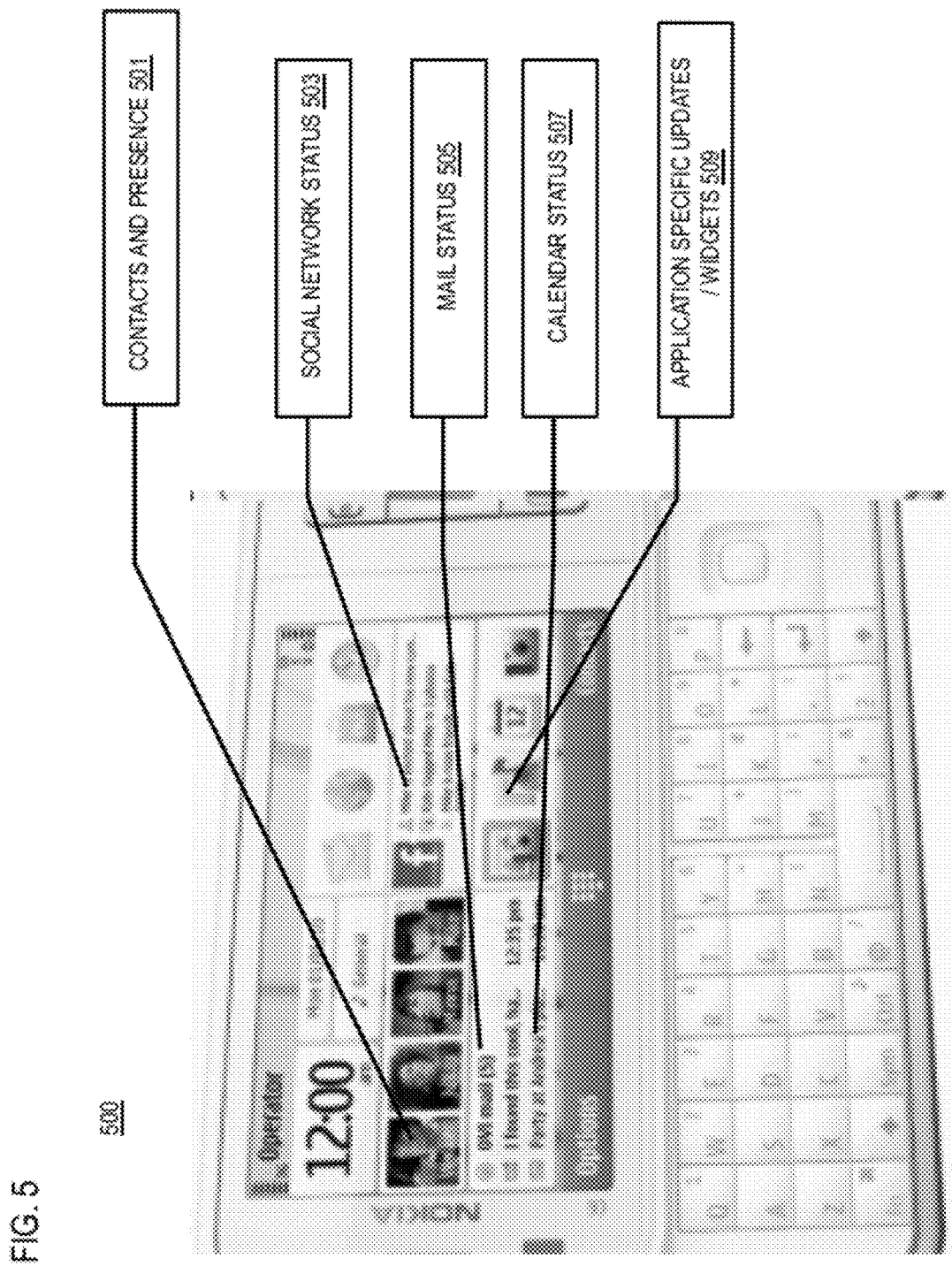
FIG. 5 is a diagram of a user interface utilizing the processes of FIG. 4, according to one embodiment.

FIG. 5 is a diagram of a user interface utilizing the processes of FIG. 4, according to one embodiment. The user interface 500 shows desktop components 501, 503, 505, 507, 509 that can be implemented via the pub/sub interface. As such, one or more of the desktop components 501, 503, 505, 507, 509 can subscribe to information from another desktop component from an external source. In certain embodiments, one or more of the desktop components 501, 503, 505, 507, 509 can be added and/or moved using the user interface 500 (e.g., in response to input). Further, the user may choose which components subscribe to which information. For example a calendar status component 507 of the user interface 500 can subscribe to a work computer of the user, a personal computer of the user, a combination thereof, etc. Thus, in certain scenarios, a mobile device of the user can subscribe to multiple calendars associated with the user that, when updated by subscription, can format both business and personal calendar information. In other scenarios, some of the desktop components can be proactive (e.g., working independently of external input).

With the above approaches, a seamless virtual desktop that supports dynamically pluggable components is provided. The pub/sub nature of the approach allows for an efficient manner to combine components together and to direct asynchronous updates across various devices, including a cloud. Further, the pub/sub manner of approach lends itself well to hierarchical and recursive constructions as one component can be updated after another. Moreover, in embodiments using mobile devices, the device can publish one update to update a plurality of different components subscribing to the information of the mobile device.

The processes described herein for maintaining a virtual desktop may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
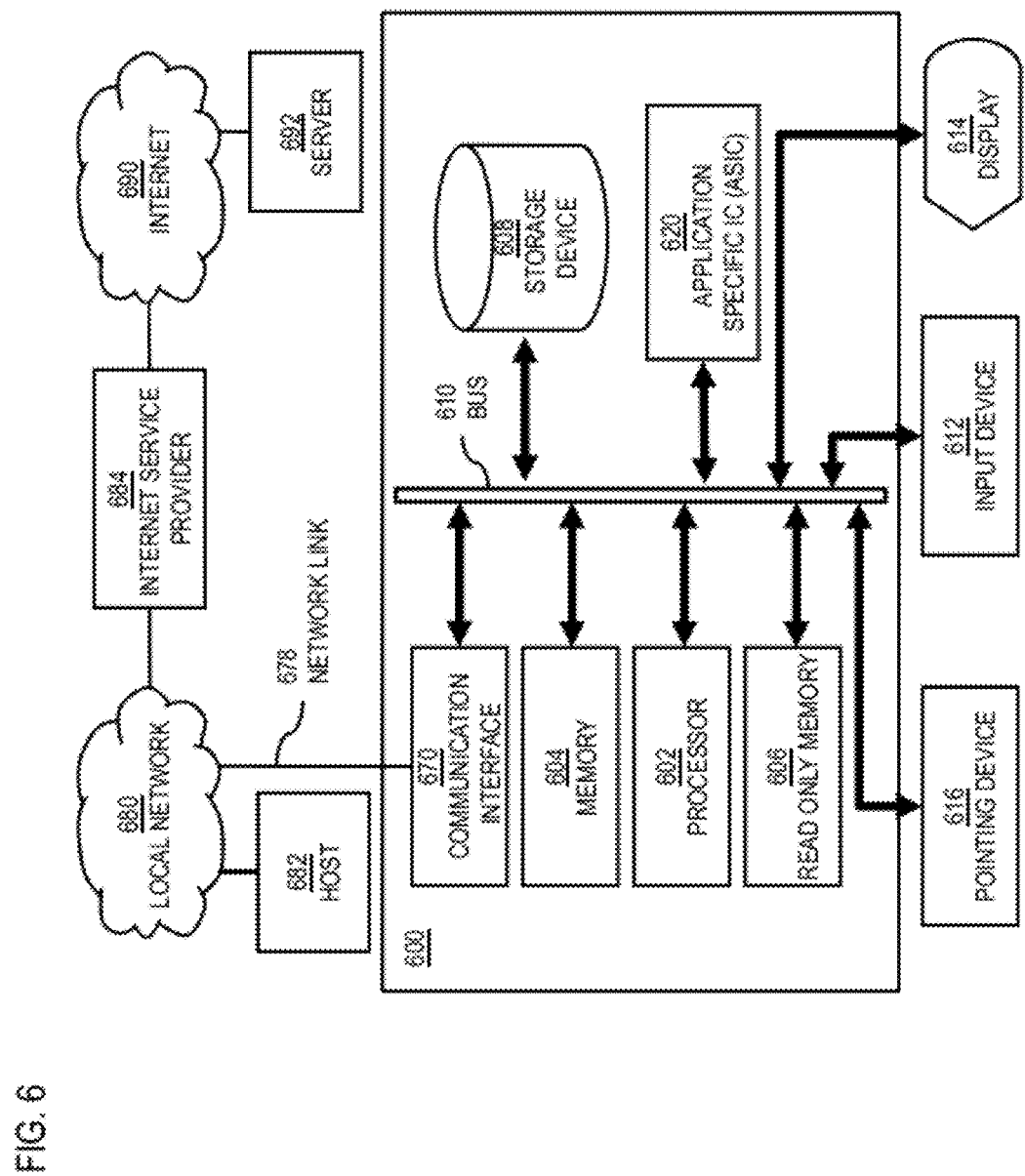
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to maintain a virtual desktop as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of maintaining a virtual desktop.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to maintain a virtual desktop. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for maintaining a virtual desktop. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for maintaining a virtual desktop, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to maintain a virtual desktop as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of maintaining a virtual desktop.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to maintain a virtual desktop. The memory 705 also stores the data associated with or generated by the execution of the inventive steps.

FIG. 8 is a diagram of exemplary components of a mobile terminal (e.g., handset) for communications, which is capable of operating in the system of FIG. 1A, according to one embodiment. In some embodiments, mobile terminal 801, or a portion thereof, constitutes a means for performing one or more steps of maintaining a virtual desktop. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of maintaining a virtual desktop. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to maintain a virtual desktop. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to facilitate access to at least one interface for subscribing to one or more inputs of one or more desktop components and for publishing one or more outputs of the one or more desktop components, for advertising the availability of one or more subscriptions to the one or more outputs of the one or more desktop components, or for a combination thereof,
   wherein the one or more subscriptions are advertised via a semantic space describing availability of the one or more desktop components,
   wherein the one or more inputs for the one or more desktop components correspond to one or more outputs of at least a first desktop component, and the one or more outputs of the one or more desktop components correspond to one or more inputs for at least a second desktop component, and
   wherein the first desktop component is subscribed to by the second desktop component, the second desktop component determines to transform the input from the first desktop component and output information to a third desktop component that subscribes to the second desktop component.

2. A method of claim 1, further comprising:
   receiving a request, over the interface, from one of the one or more desktop components for a subscription to at least one of the one or more outputs of the one desktop component,
   wherein the request for the subscription provides at least one of the one or more inputs of the one desktop component.

3. A method of claim 2, further comprising:
   determining the subscription based, at least in part, on a semantic analysis of the request.

4. A method of claim 1, further comprising:
   receiving a request, over the interface, from one of the one or more desktop components for a subscription to at least one of the one or more outputs of the at least the first desktop component,
   wherein the request for the subscription provides at least one of the one or more inputs of the at least the first desktop component.

5. A method of claim 1, wherein the one or more inputs and the one or more outputs of respective ones of the one or more desktop components define respective boundaries of the one or more desktop components within a desktop space.

6. A method of claim 1, further comprising:
   determining to select at least one desktop component to generate one or more desktops based, at least in part, on one or more criteria.

7. A method of claim 6, wherein the one or more desktops include a personalized desktop, a shared desktop, or a combination thereof.

8. An apparatus comprising:
   at least one processor; and
   at least one memory including computer program code for one or more programs,
   the at least one memory and the computer program code configured to, with the at least one processor, cause the apparatus to perform at least the following,
      determine to facilitate access to at least one interface for subscribing to one or more inputs of one or more desktop components and for publishing one or more outputs of the one or more desktop components, for advertising the availability of one or more subscriptions to the one or more outputs of the one or more desktop components, or for a combination thereof,
      wherein the one or more subscriptions are advertised via a semantic space describing availability of the one or more desktop components,
      wherein the one or more inputs for the one or more desktop components correspond to one or more outputs of at least a first desktop component, and the one or more outputs of the one or more desktop components correspond to one or more inputs for at least a second desktop component, and
      wherein the first desktop component is subscribed to by the second desktop component, the second desktop component determines to transform the input from the first desktop component and output information to a third desktop component that subscribes to the second desktop component.

9. An apparatus of claim 8, wherein the apparatus is further caused to:
   receive a request, over the interface, from one of the one or more desktop components for a subscription to at least one of the one or more outputs of the one desktop component,
   wherein the request for the subscription provides at least one of the one or more inputs of the one desktop component.

10. An apparatus of claim 9, wherein the apparatus is further caused to:
    determine the subscription based, at least in part, on a semantic analysis of the request.

11. An apparatus of claim 8, wherein the apparatus is further caused to:
    receive a request, over the interface, from one of the one or more desktop components for a subscription to at least one of the one or more outputs of the at least the first desktop component,
    wherein the request for the subscription provides at least one of the one or more inputs of the at least the first desktop component.

12. An apparatus of claim 8, wherein the one or more inputs and the one or more outputs of respective ones of the one or more desktop components define respective boundaries of the one or more desktop components within a desktop space.

13. An apparatus of claim 8, wherein the one or more subscriptions are advertised via a semantic space including, at least in part, metadata describing the one or more desktop components.

14. An apparatus of claim 8, wherein the apparatus is further caused to:
determine to select at least one desktop component to generate one or more desktops based, at least in part, on one or more criteria.

15. An apparatus of claim 14, wherein the one or more desktops include a personalized desktop, a shared desktop, or a combination thereof.

16. A non-transitory computer-readable storage medium comprising one or more sequences of one or more instructions which, when executed by one or more processors, cause an apparatus to at least perform the following steps: determining to facilitate access to at least one interface for subscribing to one or more inputs of one or more desktop components and for publishing one or more outputs of the one or more desktop components, for advertising the availability of one or more subscriptions to the one or more outputs of the one or more desktop components, or for a combination thereof, wherein the one or more subscriptions are advertised via a semantic space describing availability of the one or more desktop components, wherein the one or more inputs for the one or more desktop components correspond to one or more outputs of at least a first desktop component, and the one or more outputs of the one or more desktop components correspond to one or more inputs for at least a second desktop component, and wherein the first desktop component is subscribed to by the second desktop component, the second desktop component determines to transform the input from the first desktop component and output information to a third desktop component that subscribes to the second desktop component.

17. A non-transitory computer-readable storage medium of claim 16, wherein the apparatus is further caused to perform: receiving a request, over the interface, from one of the one or more desktop components for a subscription to at least one of the one or more outputs of the one desktop component, wherein the request for the subscription provides at least one of the one or more inputs of the one desktop component.

18. A non-transitory computer-readable storage medium of claim 17, wherein the apparatus is further caused to perform: determining the subscription based, at least in part, on a semantic analysis of the request.

19. A non-transitory computer-readable storage medium of claim 16, wherein the apparatus is further caused to perform: receiving a request, over the interface, from one of the at least one desktop component for a subscription to at least one of the one or more outputs of another one of the at least the first desktop component, wherein the request for the subscription provides at least one of the one or more inputs of the at least the first desktop component.

* * * * *